United States Patent [19]

Held

[11] Patent Number: 4,696,107
[45] Date of Patent: Sep. 29, 1987

[54] PRUNING SHEARS
[75] Inventor: Peter Held, Betzdorf/Sieg, Fed. Rep. of Germany
[73] Assignee: Wolf-Gerate GmbH, Fed. Rep. of Germany
[21] Appl. No.: 774,069
[22] Filed: Sep. 9, 1985
[30] Foreign Application Priority Data
  Sep. 7, 1984 [DE] Fed. Rep. of Germany ... 8426495[U]
[51] Int. Cl.$^4$ ............................................. B26B 13/00
[52] U.S. Cl. ...................................... 30/246; 30/245; 30/187; 30/249
[58] Field of Search .................. 30/249, 245, 244, 187
[56] References Cited

U.S. PATENT DOCUMENTS

| | | | |
|---|---|---|---|
| 598,428 | 2/1898 | Manning | 30/245 |
| 2,242,476 | 5/1941 | Newman | 30/245 |

FOREIGN PATENT DOCUMENTS 137436 9/1952 Sweden ................................ 30/246

Primary Examiner—Frank T. Yost
Assistant Examiner—Willmon Fridie, Jr.
Attorney, Agent, or Firm—Ostrolenk, Faber, Gerb & Soffen

[57] ABSTRACT

In pruning shears a rope-and-pulley device is incorporated between the shears legs in such a manner that by pulling the free end of the rope an amplified closing force is obtained. For convenient remote operation one shears leg force lever arm is connected fixedly or detachably to a handle of any desired length, by a handle securing coupling which extends parallel to the shears leg. An opening spring biases the shears in the opening direction.

8 Claims, 2 Drawing Figures

PRUNING SHEARS

The invention relates to pruning shears comprising two shear levers articulated together. Such shears used mainly for pruning trees are known in various constructional forms. Frequently, they operate with multiple leverage to obtain a high cutting power with acceptable force expenditure. For the same reason the grip levers are generally made very long to make the force lever arm as large as possible. Because of the multiple leverage and the correspondingly long actuating travel the grip members in the open position of the levers lie far apart making manipulation awkward when large resistances are to be expected.

The invention is thus based on the problem of improving pruning shears of the type according to the preamble in such a manner that with a low force expenditure the relatively long travel necessary for the operation for the manipulation can be carried out conveniently and in an ergonometrically favourable manner.

By constructing the force amplifying means as rope-and-pulley device it is ensured that the necessary travel can be effected by the operator in the particular most convenient position by pulling the rope of the rope-and-pulley device because this pulling direction is defined by the position of the guide pulleys or their axes and in addition can be defined to a certain extent by the operator himself. By corresponding construction of the rope-and-pulley device, also in the form of differential pulley tackle, practically any necessary force amplification can be achieved, and the increased operating travel thereby resulting can easily be managed by shifting the grip on the drive rope. However, it has been found in practice that a conventional rope-and-pulley device having for example two fixed and two loose pulleys is adequate for the requirements arising in practice.

The invention also has the further advantage that even high branches or branches a long way away can be cleanly and easily cut from a relatively great distance because the shears can be equipped with a handle of any desired length which need only be joined to one of the shears legs. According to a preferred embodiment of the invention for this purpose one of the force lever arms is provided with a coupling member of a handle securing coupling so that the shears can be used with or without handle and stored in space-saving manner. It is of course also possible to provide the shears with a fixed handle.

Admittedly, pruning cutters provided with a handle are already known in which via a pull rope or cable and force transmission gearing a cutting blade is pivoted against an abutment which is made U-shaped and drawn over the branch. These pruning cutters are admittedly suitable for thin branches but fail to cut relatively thick branches.

The pruning shears themselves may be constructed for example in accordance with DE-OS 3,136,119. The invention is however applicable to all other comparable pruning shears. As handle securing coupling in particular a handle securing coupling according to DE-PS 3,130,703 is suitable.

Further expedient developments of the invention will be apparent from the subsidiary claims.

Hereinafter an example of embodiment of the invention will be described with the aid of the drawings, wherein.

Figure 1:
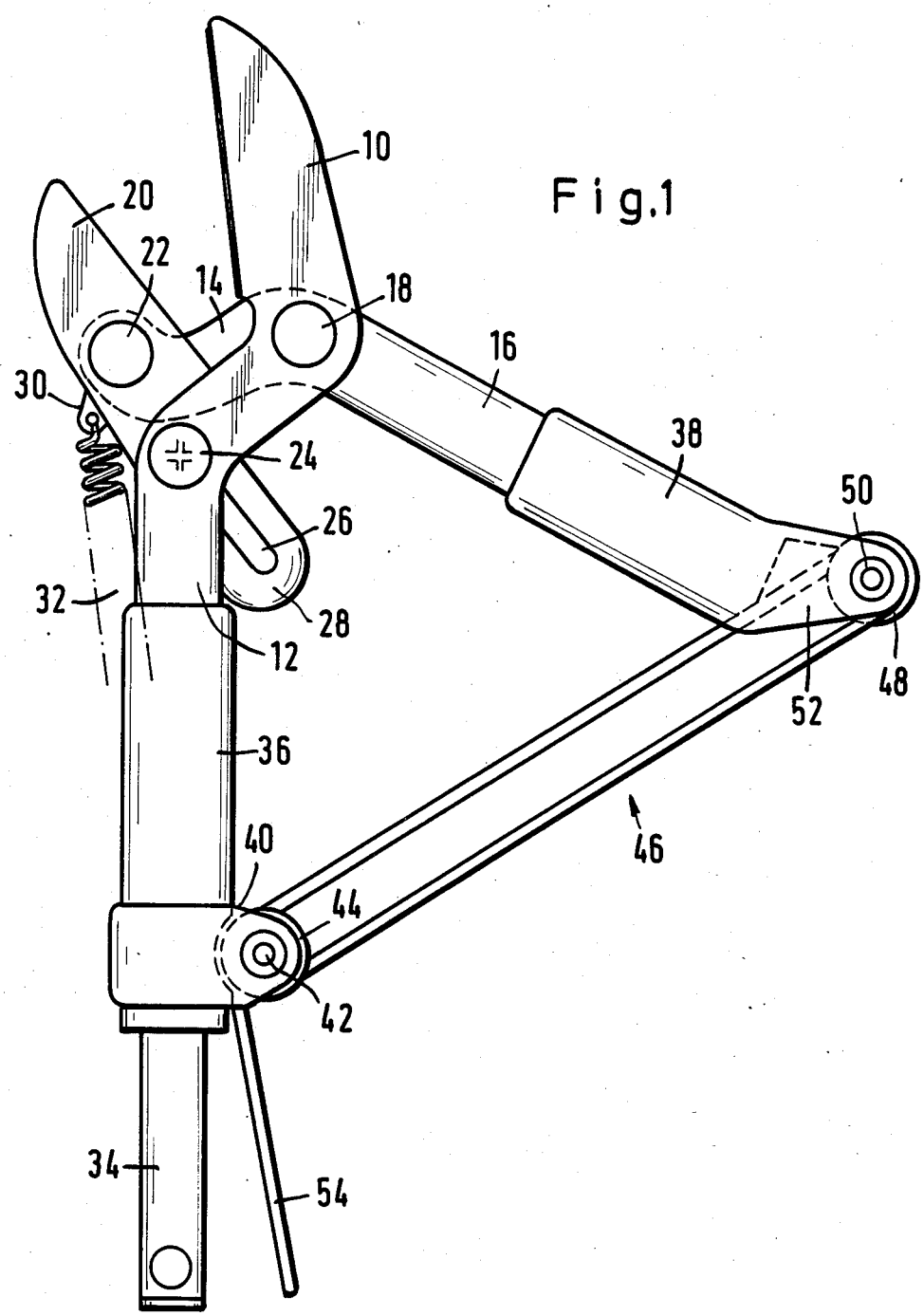
FIG. 1 is a view of pruning shears constructed according to the invention in the open position.

The pruning shears comprise two shears levers connected via a pivot pin 18. The first shears lever comprises a load lever arm in the form of a cutting blade 10 and force lever arm 12. The lever consists of two bent flat irons. The second shears lever likewise consisting of a bent flat iron has a load lever arm 14 and a force lever arm 16. The load lever arm 14 is articulately connected via pivot pin 22 to an anvil 20 cooperating with the cutting blade 10. A sliding pivot pin 24 fixed in the force lever arm 12 engages in an elongated slot 26 of an extension 28 of the anvil 20. A holding plate 30 is arranged projecting outwardly at the end of the load lever arm 14 by means of the pivot pin 22. In a hole of said holding plate the end of a helical tension spring 32 is anchored whose other end engages on a pin not illustrated in the drawings which projects from the back of the force lever arm 12 or the sleeve 36 pulled thereover. By said spring 32 the shears are biased into the open position illustrated in FIG. 1. Instead of the holding plate 30 the spring could also engage an extension of the load lever arm 14. However, the arrangement of the holding plate 30 has the advantage that no modification of the shears levers is necessary compared with a hand shears construction.

The force lever arm 12 or the sleeve 36 drawn thereover and consisting for example of plastic continue in an implement insert tenon 34 which forms one part of a handle securing coupling whose other coupling member is provided at the end of a handle not illustrated. The handle securing coupling is conveniently constructed in accordance with DE-PS 3,130,703 but may alternatively have any other form. It is however also possible to connect an extended arm fixedly to the force lever arm 12.

From the sleeve 36 two fork arms 40 project laterally and carry between them an axle 42 on which in series two "fixed" pulleys 44 of a rope-and-pulley device 46 are mounted freely rotatably.

Figure 2:
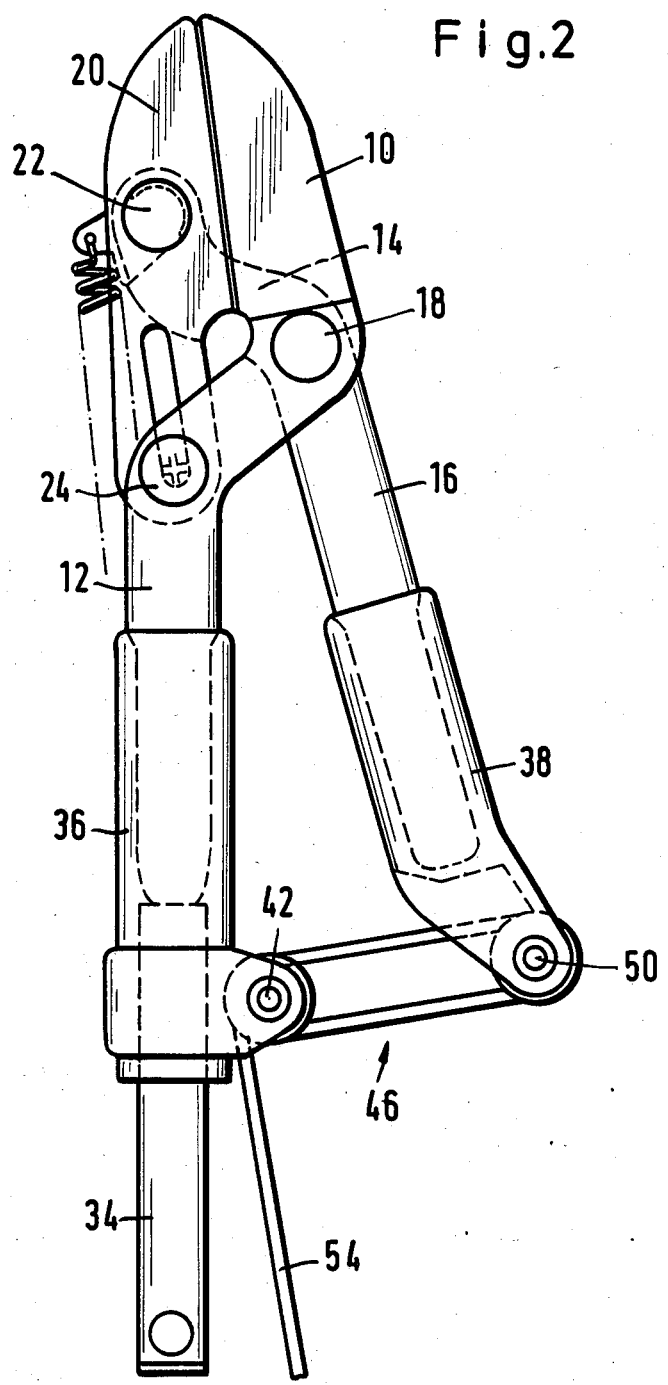
FIG. 2 is a view of the shears illustrated in FIG. 1 in the closure position.

A sleeve 38 pulled onto the force lever arm 16 continues in two fork arms 52 between which an axle 50 is fixed on which one behind the other two "loose" pulleys of the rope-and-pulley device 46 are rotatably mounted. One end of a cable or rope 54 is fixed to the free end of the sleeve 36 or of the force lever arm 12 and led round one of the pulleys 48, for example the rear pulley according to FIGS. 1 and 2, then extending to the rear pulley 44 and from there back to the front pulley 48 and then over the front pulley 44 of the rope-and-pulley device 46. At the free end of the rope 54 a grip, not illustrated, is secured which the operator can grip.

The sleeves 36 and 38 may be used as grip if the pruning shears are to be used as hand shears. Measures may also be taken (not illustrated in the drawings) for lengthening the force lever arms of the two shears levers as is the case in conventional pruning shears.

For thicker branches, however, shears actuation via the rope-and-pulley device is preferred because the already considerable leverage of the shears is further increased and will low force expenditure a high cutting force can be imparted. It is of particular advantage that a pull can be exerted in the direction of a shears leg instead of the inward movement of the hands otherwise necessary with hand pruning shears, which is not ergonometrically favourable.

By means of the handle securing coupling handles of any desired length can be secured to the implement insert tenon 34 so that convenient operation is ensured even for branches a long way away.

The rope-and-pulley device construction according to the invention for operating the shears legs is not restricted to the shears illustrated in the drawings but is suitable to all designs of shears with or without additional lever arrangements. It is also possible to mount in each case only one fixed and loose pulley on the grip legs or more than two pulleys in each case. Furthermore, it is also possible according to the invention to incorporate a pulley block with one fixed pulley only or a differential pulley block between the shears legs.

Means not illustrated in the drawings may be provided for locking the shears against the opening force of the spring 32 in the closure position.

According to the example of embodiment described above the rope device between the two legs of the shears levers was described as pulley block having at least one loose and one fixed pulley. If for specific purposes a force amplification is not necessary a simple pulling device can be disposed between the two legs by providing a guide roller on the leg provided with the handle and allowing the end of the rope to engage the opposite movable leg. By the handle arrangement it is then possible to operate the shears via the pulling rope over a considerable distance so that in many cases a ladder or the like can be dispensed with.

I claim:

1. Pruning shears comprising a pair of levers and a pivot connection between the levers intermediate the lengths of the levers by which the levers are pivotally connected together;
   each lever having a first portion extending on one side of the pivot connection and the first portions cooperating to form together a cutting tool adapted for pruning;
   each lever having a second portion extending on the other side of the pivot connection forming a pair of handles operable toward and away from each other;
   a spring disposed between the shears levers for driving the first portions of the levers apart;
   a force multiplying rope-and-pulley connection between the second portions of the levers comprising a pulley on each lever second portion and a rope wrapped around the pulleys; an end of the rope extending to facilitate manual grasping thereof;
   a coupling member connected to one of the lever second portions, the coupling member having means to removably secure and position an extension of the one lever forming a manual support for the pruning shears;
   a holding plate pivoted to the one lever at the first portion thereof; and which comprises an anvil, the anvil being attached on the holding plate to pivot therewith; the lever opening spring having one end anchored to the holding plate, a pin on the second portion of the one lever arm, the other end of the spring being anchored to the pin on the second portion of the one lever arm.

2. Pruning shears according to claim 1, wherein the rope-and-pulley connection comprises a respective set of two pulleys which are mounted freely rotatably on each of the second portions of the levers.

3. Pruning shears according to claim 2, wherein at the second lever is disposed the end of the rope of the rope-and-pulley device.

4. Pruning shears according to claim 1, wherein the spring is a helical tension spring and acts between the levers.

5. Pruning shears according to claim 1, wherein the coupling member is oriented for causing the extension to extend parallel to the one lever second portion.

6. Pruning shears according to claim 1, wherein the levers are each in the form of a bent flat iron.

7. Pruning shears according to claim 2, wherein there is a respective sleeve on each of the second portions, and there is a respective pulley axle on each sleeve for the respective pulleys for that lever.

8. Pruning shears comprising a pair of levers and a pivot connection between the levers intermediate the lengths of the levers by which the levers are pivotally connected together;
   each lever having a first portion extending on one side of the pivot connection and the first portions cooperating to form together a cutting tool adapted for pruning;
   each lever having a second portion extending on the other side of the pivot connection forming a pair of handles operable toward and away from each other;
   means on the levers to drive the first portions of the levers apart;
   a force multiplying rope-and-pulley connection between the second portion of the levers comprising a respective set of two pulleys which are mounted freely rotatably on each of the second portions of the levers; a respective sleeve on each of the lever second portions, and a respective pulley axle on each sleeve for the respective pulleys for that lever; a rope wrapped around the pulleys; an end of the rope extending to facilitate manual grasping thereof;
   a coupling member connected to one of the lever second portions, the coupling member having means to removably secure and position an extension of the one lever forming a manual support for the pruning shears.

* * * * *